J. A. PETERS.
MOTOR CYCLE.
APPLICATION FILED JAN. 12, 1922.

1,413,351.　　　　　　　　　　Patented Apr. 18, 1922.

INVENTOR
J. A. Peter
By
Atty.

UNITED STATES PATENT OFFICE.

JAMES ARTHUR PETERS, OF THE WHITE HOUSE, NEAR SCARBOROUGH, ENGLAND.

MOTOR CYCLE.

1,413,351.  Specification of Letters Patent.  Patented Apr. 18, 1922.

Application filed January 12, 1922. Serial No. 528,681.

*To all whom it may concern:*

Be it known that I, JAMES ARTHUR PETERS, a British subject, residing at The White House, near Scarborough, in the county of Yorkshire, England, have invented certain new and useful Improvements in Motor Cycles, of which the following is a specification.

The object of the present invention is to provide an improved rear wheel lower fork for motor cycles which combines the functions of a member of the motor cycle frame and of a conveyor and silencer for the exhaust gases.

With this object in view the invention consists in the features hereinafter described and claimed in the annexed claiming clauses.

In the accompanying drawing an improved rear wheel lower fork for a motor cycle is shown in full lines forming part of an improved motor cycle set out in my co-pending U. S. applications filed January 12, 1922, Serial Numbers 528,679 and 528,683, portions of which are indicated in chain-dotted lines.

Figure 1:
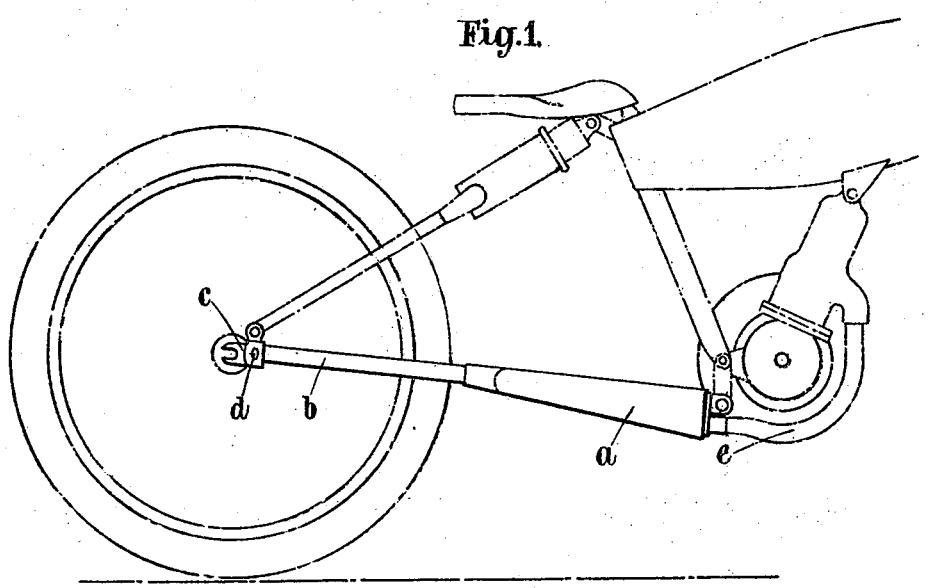
Figure 2:
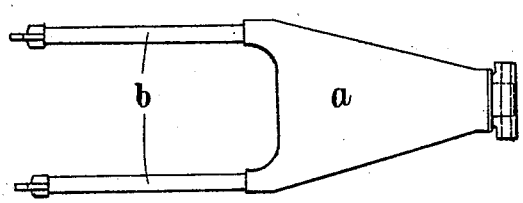

Referring now to the drawing in which Fig. 1 represents an elevation and Fig. 2 a plan, the lower rear wheel fork is formed of a box-like member $a$ constituting a silencer and two exhaust tubes $b$, the whole being substantially formed and suitably secured together so as to be adapted to serve as a supporting framework for the rear wheel. The tubes are fitted with axle forks $c$ formed as extensions thereto and with outlet passages $d$ for the escape of the exhaust gases. The front end of the box-like member is adapted to be fitted to the frame of the motor cycle and to receive the end of the exhaust pipe $e$. In the form shown, the combined fork serves as a radius-rod to alter the position of the rear wheel for the purpose of varying the transmission gear which is of the movable pulley-flange type; but this forms no part of and is not essential to the present invention.

I claim:—

1. A motor cycle rear wheel lower fork, including a hollow box-like member at one end, and hollow pipes in open communication with said member, said pipes providing at their free terminals supports for the rear wheel and being formed adjacent said supports with atmospheric vents, the end of the box-like member remote from the rear wheel supports being in open communication with the exhaust pipe from the engine.

2. A lower fork for the rear wheel of a motor cycle, constructed to provide a hollow box-like member having open communication at one end with the exhaust pipe of the engine, said fork including pipes projecting in substantially parallel relation from one end of the box-like member and in open communication therewith, said pipes remote from the box-like member providing supports for the rear wheel and being formed with atmospheric vents.

In testimony whereof I affix my signature.

JAMES ARTHUR PETERS.